United States Patent [19]
Benioff et al.

[11] Patent Number: 5,322,662
[45] Date of Patent: Jun. 21, 1994

[54] METHOD FOR MAKING A DISPENSING PACKAGE INCLUDING BLOW MOLDING AND INSERTING A SPOUT

[75] Inventors: B. Richard Benioff, Lambertville; John S. Frazer, Long Beach Township, Beach Havin County, both of N.J.; Richard A. Yaffa, Harrison, N.Y.; Tadeusz Szczurek, Oceanport, N.J.

[73] Assignee: Manhattan Products, Inc., Carlstadt, N.J.

[21] Appl. No.: 14,868

[22] Filed: Feb. 8, 1993

Related U.S. Application Data

[62] Division of Ser. No. 673,645, Mar. 22, 1991, Pat. No. 5,234,130.

[51] Int. Cl.$^5$ .................. B29C 49/20; B29C 65/66
[52] U.S. Cl. ...................... 264/533; 425/525; 29/421.1; 29/447
[58] Field of Search ............... 264/533, 523, 336, 318, 264/540; 425/525, 532, 393, 403, 438; 29/411, 421.1, 445, 447, 515; 222/109, 111, 571, 570; 215/DIG. 1, 31

[56] References Cited

U.S. PATENT DOCUMENTS

| | | | |
|---|---|---|---|
| 3,791,098 | 2/1974 | Webster | 264/516 |
| 4,127,632 | 11/1978 | Anger | 264/318 |
| 4,143,453 | 3/1979 | Taluba | 264/533 |
| 4,578,028 | 3/1986 | Dirksing et al. | 264/533 |
| 4,984,714 | 1/1991 | Sledge | 222/109 |
| 4,993,605 | 2/1991 | Del'Re | 222/109 |

FOREIGN PATENT DOCUMENTS 214675  8/1985  European Pat. Off. ............. 222/109

Primary Examiner—Catherine Timm
Attorney, Agent, or Firm—William Squire

[57] ABSTRACT

A dispensing package includes a bottle, made of a blow-moldable plastic and having a neck finish, a pouring spout and a closure. An undercut groove in the interior of the neck finish holds a bead on the spout. The spout may have a pour-back design. Threading the closure onto the neck finish engages a top surface of the neck finish just above the groove with a closure-mounted seal. The groove may result from molding the neck finish against a pin which is withdrawn from the neck finish while the plastic is still warm but has enough plastic memory to result in groove definition following pin removal. The bead of the spout may be press-fitted into the groove while the plastic is warm so that cooling-caused shrinkage firmly locks the spout in place.

1 Claim, 4 Drawing Sheets

METHOD FOR MAKING A DISPENSING PACKAGE INCLUDING BLOW MOLDING AND INSERTING A SPOUT

This is a Division of co-pending U.S. application Ser. No. 673,645 filed Mar. 22, 1991, now U.S. Pat. No. 5,234,130.

BACKGROUND OF THE INVENTION

The present invention relates to a package for a pourable material and, more particularly, to a dispensing package which comprises a bottle, a pour-back spout and a closure. The present invention also relates to the features and aspects of the individual elements of the dispensing package, that is, to the features and aspects of the bottle, the pour-back spout and the closure.

Numerous types and styles of bottles for holding pourable materials are well known. Bottles made of polyethylene or other plastic or polymeric materials which are formed by blow-molding are commonly used as containers for soaps, detergents, bleaches, other laundry products, various foodstuffs and other liquid and particulate materials. In blow-molding, a heated, deformable body or cylindrical tube of unsolidified, plastic or polymer is extruded around an end of a hollow member or blow pin which extends into the body. Air or other gas may be blown or injected through the blow pin. The still deformable body is placed within an openable cavity mold having an interior contour which mirrors that of the exterior of the final product.

After the deformable body is located within the mold, air is blown or injected through the blow pin into the interior of the deformable body to expand it like a balloon. As the deformable body expands outwardly, it comes into contact with the interior of the mold. Further expansion and the on-going positive pressure within the now hollow interior of the plastic or polymer body force the still heated plastic or polymer against the interior of the mold. This results in the now expanded body assuming a shape complementary to the mold's interior. The plastic or polymer may cool to a selected degree due to its contact with the mold, which may be maintained at a predetermined temperature. When the plastic or polymer reaches a sufficient degree of coolness, it becomes sufficiently solidified or set into a configuration, in which its exterior contour permanently assumes the shape of the mold. The mold is then opened to permit removal of the molded product and the blow pin is removed from the product's interior. Removal of excess material adhering to the molded product, especially at the former point of entry of the blow pin may require cutting or trimming thereof from the product.

As is well known, the above procedure may be utilized to produce a bottle. The top portion of the bottle, often closable with a threaded closure or cp, has an opening through which material held in the bottle is pourable. This top portion is often referred to as a "neck finish."

The mold may be formed so as to produce a final product or bottle and a neck finish having various complex shapes. For example, the exterior of the neck finish may have formed thereon integral threads, as well as undercut areas, which result from the action of appropriately configured areas of the openable mold. Undercuts may be formed on the exterior of the neck finish due to the fact that the mold is opened away from the product's exterior upon its assuming its final configuration.

Undercuts are, however, typically avoided on the interior surface of the neck finish. This is so because the blow pin is typically not collapsable away from the interior surface. Withdrawal of the blow pin from the neck finish would cause exterior protruding portions of the blow pin about which the undercuts were formed to deform or distort non-undercut, smaller diameter portions of the interior of the neck finish. Such deformation is generally thought to be undesirable.

A wide variety of pouring spouts for the above type of bottle are also well known. In some cases bottles with integral spouts may be formed by blow-molding. Typically, however, pouring spouts are formed separately from their associated bottles and are thereafter mounted to the exterior or interior of the neck finish in numerous ways. Usually, non-integral pouring spouts are molded from polyethylene or other plastic or polymer. These spouts may be mounted to neck finishes by snapping or threading together mating portions on the spouts and the neck finishes, by adhering the spouts to the neck finishes, or by other techniques. Primary concerns of packaging manufacturers are the expedient, inexpensive production of bottles and spouts and the expedient, inexpensive attachment of the spouts to the bottles. A further concern is that the attachment of the spouts to the bottles retain integrity and remain essentially leakproof to minimize spillage and leakage during shipment and during use by consumers.

A known type of pouring spout is a so-called pour-back spout. Pour-back spouts generally include an elongated nozzle or funnel having a pouring lip at one end. The exterior of the other end of the nozzle is connected to a web or floor which is, in turn, connected to the interior of a cylinder which surrounds and extends above the lower portion of the nozzle. Formed through the web or floor is a drain hole which is located diametrically opposite the pouring lip. Poured material which drips down the lip and the exterior of the nozzle is caught by the web and directed to the drain hole whereat it returns to the bottle. The surrounding of the funnel by the cylinder prevents dripping material from reaching the exterior of the neck finish and the bottle, while the web and the drain hole obviate wasting of the material.

Typical closures for the foregoing bottles and spouts may constitute molded polypropylene or other plastic screw caps, which may be threaded onto and off the neck finish and which surround and enclose the pouring spout when so threaded on. It is common for such caps to include facilities which seal against the spout or the neck finish when the cap is threaded on. Such sealing prevents the material within the bottle from reaching the threaded cap/neck finish interface to limit leakage.

SUMMARY OF THE INVENTION

The present invention contemplates a bottle, which individually is novel as to structure, function and method of production. The present invention also contemplates such a bottle which is associated with a pour spout to constitute a dispensing package possessing novel structure and function and which is produced by a novel production method. Lastly, the present invention contemplates a novel closure which cooperates with the aforenoted dispensing package in a novel manner to produce a novel closable dispensing package. According to the present invention, the foregoing objectives are achieved in a novel, expedient, inexpensive manner while ensuring leak-proof attachment between the bottle and the pouring spout and between the bottle and the closure in shipment and in use.

With the foregoing in view, one aspect of the present invention is an improved bottle for dispensing a pourable substance. The bottle is blow-molded from a suitable material such as HDPE, and includes a substance-containing chamber with an integral upper neck finish. The neck finish includes a collar portion having a top surface. The collar is produced by (a) forming a melt of the material about a member, such as a blow pin, which is contoured to produce an undercut channel in the interior of the neck finish just below the top surface, and (b) then removing the member before the collar has cooled significantly. This removal momentarily expands the channel and the collar, but the developing plastic memory of the collar returns it and the channel substantially to their as-formed diametric dimensions.

The pouring spout includes a surface feature which fits into the channel to mount the spout to the neck finish. The surface feature is placed in the channel before the collar cools significantly and before the majority of cooling-caused shrinkage of the collar and the channel occurs. Thus, insertion at this time is expedient and convenient. When maximum shrinkage occurs, the surface feature is locked into the undercut channel and the spout is locked and sealed to the interior of the neck finish. The surface feature may be a bead formed on a base of the pouring spout, which may be a pour-back or drain-back spout.

The closure is removably mountable to the neck finish. When so mounted, as by threading, an internal seal engages the collar's top surface to prevent substance leakage. Also, the closure may include an internal extension which is proximate a surface of the spout when the closure is mounted to the neck finish. The extension aids the bead-channel engagement to limit movement of the spout out of the collar during shipping and stocking.

DETAILED DESCRIPTION

Figure 1:
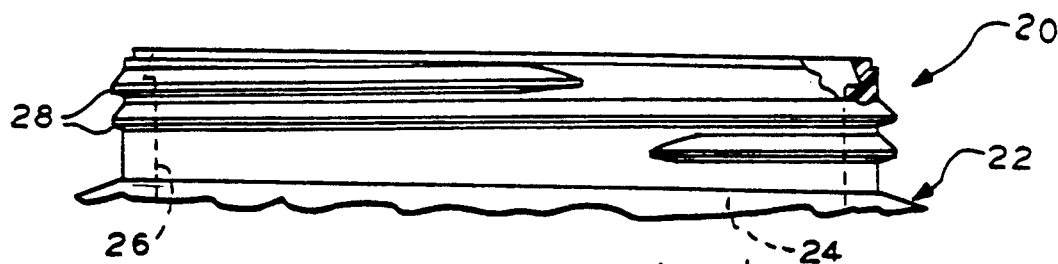
FIG. 1 is a partially sectioned, side elevation of a neck finish portion of a blow-molded bottle according to the principles of the present invention.

Referring first to FIG. 1, there is shown the upper portion or neck finish 20 of a bottle 22, the details of the lower portion of which are not important to the present invention. The bottle 22 is preferably formed by the blow-molding of appropriate materials, such as high density polyethylene ("HDPE"). HDPE is preferred for household chemical containment since it is recyclable and resists stress cracking which such chemicals can cause. For the purpose of containing other material or food stuffs, the bottle 22 may be blow molded from low density polyethylene ("LDPE"), a copolymer such as a mixture of HDPE and LDPE, and PVC, as well as other suitable materials.

The bottle 22 encloses a volume, generally designated at 24, for containing a mass of pourable material (not shown) which may comprise a liquid or particulate laundry product, a food-stuff or the like. The contained material is intended to be poured out of the volume 24 via an opening 26 through the neck finish 20. Typically, the neck finish 20 and its upper portion or collar 27 are diametrically smaller than the main lower portion of the bottle 22 and may include facilities, such as an exterior thread 28, permitting a closure 30 (FIGS. 11 and 12) to be removably mounted thereon.

Figure 2:
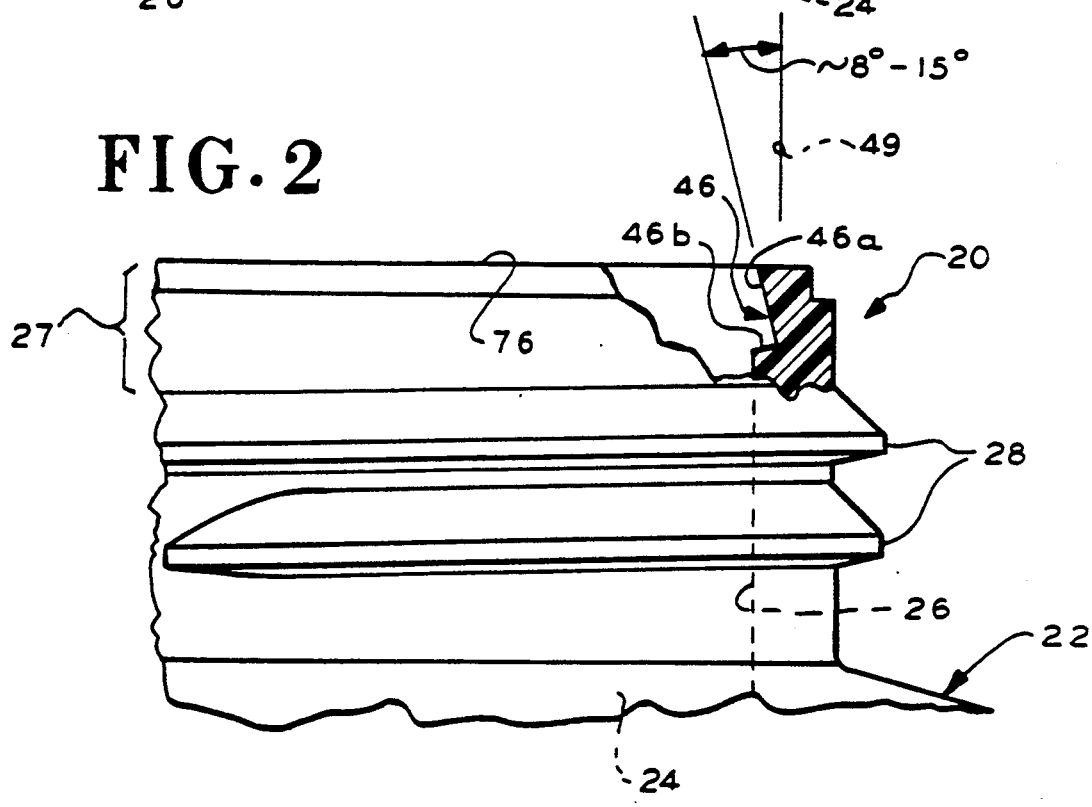
FIG. 2 is an enlarged view of the sectioned portion of FIG. 1 showing in greater detail the novel structure thereof.
Figure 3:
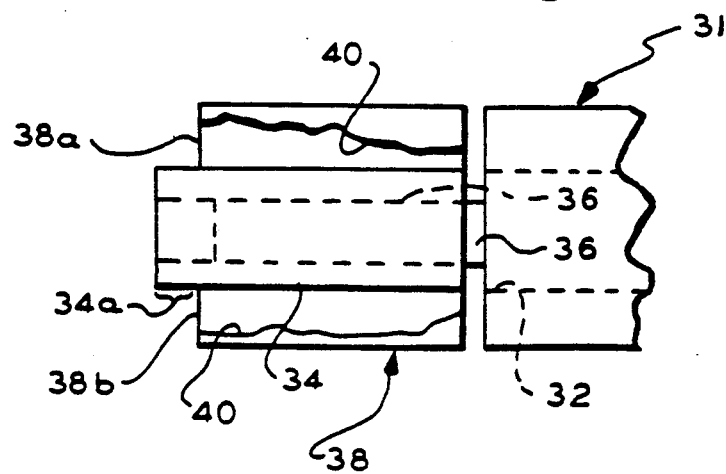
FIGS. 3-5 are schematic views of the steps involved in the manufacture of the bottle of the FIGS. 1 and 2.
Figure 4:
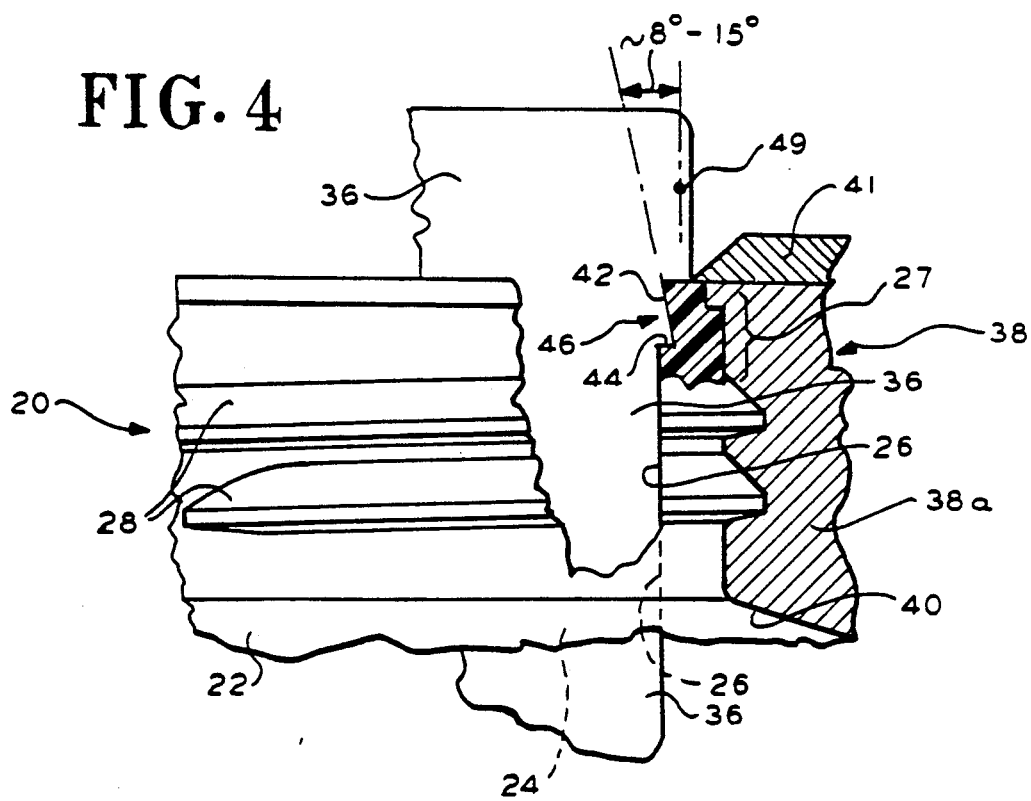
Figure 5:
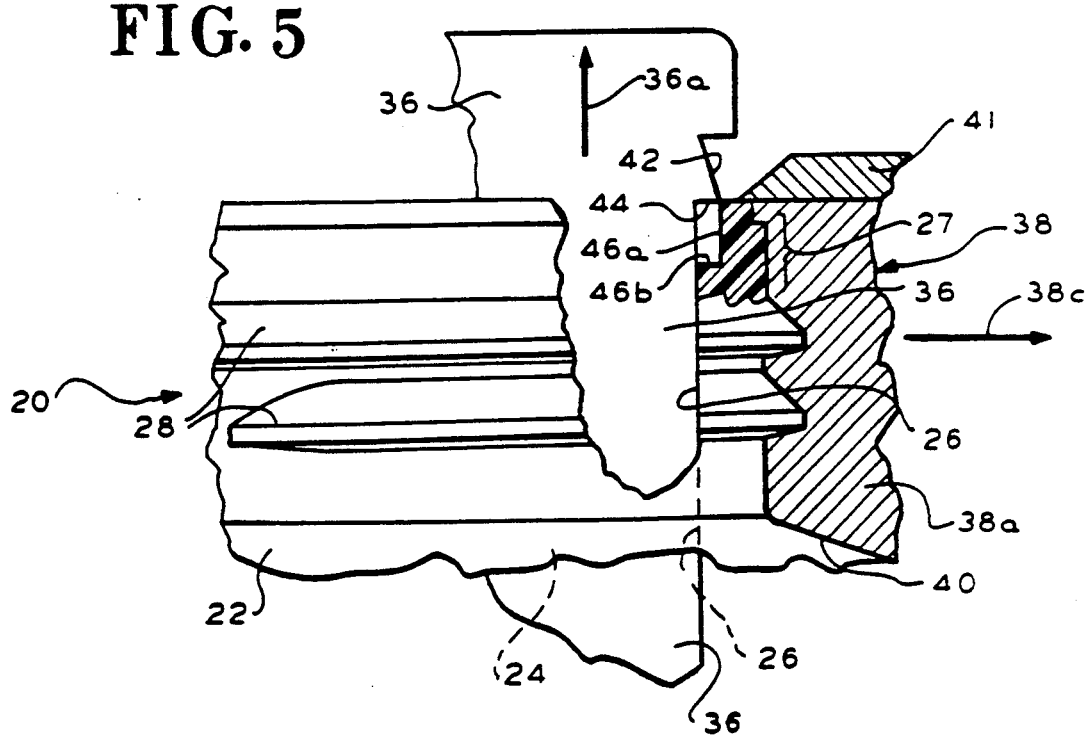
Figure 6:
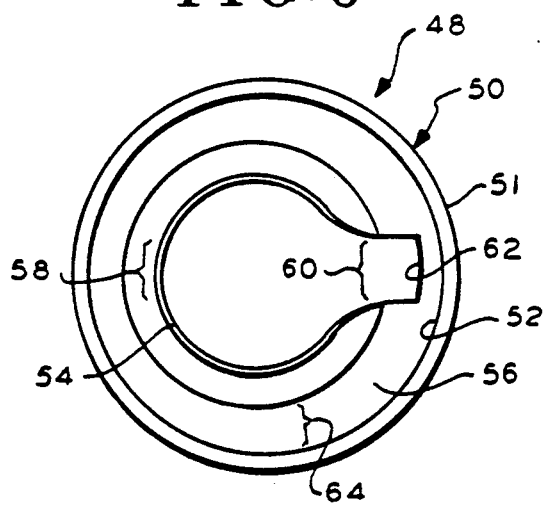
FIGS. 6-8 are, respectively top, side and rear views of a pour-back spout intended to be attached to the neck finish of the bottle of FIGS. 1 and 2 according to the novel aspects of this invention.

The blow-molding of the bottle 22 of FIGS. 1 and 2 is schematically illustrated in FIGS. 3-5. Although a variety of blow-molding techniques may be utilized, FIGS. 3-5 illustrate a so-called reciprocating process.

Referring to FIG. 3, HDPE (or other suitable plastic material) is worked in an extruder, generally depicted at 31, by a screw (not shown). After being worked, a measured mass of the hot, pliable material 34 is extruded out of a die opening 32 around a portion of the length of a blow pin 36. The plastic mass 34 is, at this time, a hollow cylinder or tube which is often called a parison 34. The parison 34 is open at both ends.

Referring to FIGS. 3 and 4, upon exiting the die opening 32, the parison 34 and the blow pin 36 partially surrounded thereby are enclosed by a previously open cavity mold generally shown at 38. The mold 38 has two halves 38a and 38b. The majority of the interior surface of the mold 38 is configured as at 40 to mirror the desired outer configuration of the main lower portion of the bottle 22. A portion 34a of the parison 34 at an end thereof remote from the point of entry of the blow pin 36 extends beyond and is pinched off by the closing mold 38. The bottom of the bottle 22 will be produced at this pinch off location 34a, which effectively closes the open end of the parison 34. A portion 34b of the parison 34 at the other end thereof is cutoff by striker plates 41 on the mold halves 38a and 38b.

The neck finish 20 and the collar 27 are formed between the portion of the mold 38 near the opening 32 and the adjacent portion of the blow pin 36. Specifically, the still hot parison 34 is externally formed to possess the thread 28 and is internally formed to have desired internal surface features between the closing mold 38 and the blow pin 36.

With the mold 38 closed, air is forced through the blow pin 36 into the interior of the parison 34. The resulting positive pressure forces the walls of the parison 34 outwardly, expanding it into contact with the interior surface 40 of the mold 38. When the still hot parison 34, now formed into the bottle 22, nonetheless has cooled enough to retain its shape (this time may be quite short), the blow pin 36 is withdrawn, and the mold 38 is opened. The bottle 22 is then ejected and/or moved to another area for further processing, such as flash removal. Depending on the type of plastic used and on other process parameters, the temperature of the mold 38 and of the air forced through the blow pin 36 may be selected relative to that of the hot parison 34 to facilitate such further processing, as is well known.

It is typical for bottles 22 which are blow-molded from HDPE as described above to move from the area of the mold 38 to other processing areas in 2 to 3 minutes or so. It has been found that although some shrinkage of the bottle 22, and particularly of its neck finish 20 and collar 27, may occur during this time, an additional hour or so is required before cooling of the bottle 22 results in about 90% of the total shrinkage which the bottle 22 will experience. Most of the 90% of this total shrinkage occurs after the initial 2 to 3 minute period following removal from the mold 38. This finding has led to one significant feature of the present invention. These specific data relate to HDPE; routine experimentation would yield equivalent data for other plastics.

Referring again to FIGS. 1, 4 and 5, it may be seen that the blow pin 36 in the vicinity of the parison 34 where the neck finish 20 will be located includes a surface portion 42 which flares outwardly and toward the distal end of the blow pin 36, ultimately intersecting a surface 44 which rejoins the blow pin 36 at a substantial right angle thereto. As may be seen, these surface features 42 and 44 on the blow pin 36 form an annular undercut channel 46 in the interior surface of the neck finish 20. The undercut channel 46 has an sloping well 46a and a horizontal wall 46b. Typically, and for reasons set forth above, this type of undercut 46 has been avoided in the past when blow molding items such as the bottle 22. According to the principles of the present invention, such an undercut channel 46 can be conveniently formed and subsequently put to expedient use in mounting a spout 48 (FIGS. 6–9, 11 and 12) in the neck finish 20.

It has been found that if the undercut of the channel 46 is not too severe, specifically when the deviation of the surface 42 and the wall 46a from a vertical line 49 is between about 8 degrees and 15 degrees, the channel 46 may be formed using standard blow-molding apparatus. What constitutes a less-than-severe undercut may vary with the plastic selected and the dimensions of the neck finish 20, but is easily determinable by the worker in the field. In FIG. 5, with the mold 38 still closed after the parison 34 has been blow-molded into the bottle 22, the plastic material of the bottle 22 is still hot and somewhat pliable, although it has begun to develop significant plastic memory. The plasticity of the still hot plastic and the mildness of the undercut of the channel 46 allow the blow pin 36 to be removed from the molded bottle 22 with the mold 38 still closed, as indicated by arrow 36a. During this withdrawal, the surface features 42 and 44 on the blow pin 36 which are responsible for the formation of the undercut channel 46 are moved out of the channel 46 and thence out of the neck finish 20. The removal of the surface features 42 and 44 from the channel 46 may cause some momentary distortion of the interior of the neck finish 20 (as generally shown in FIG. 5 by the momentary near verticality of the wall 46a). Nonetheless, the plastic memory of the hot, but now cooling and shrinking, plastic material of the neck finish 20 returns the neck finish 20 and the channel 46 to substantially their original, as-molded dimensions, as shown in FIG. 2: After the blow pin 36 is withdrawn, the mold 38 is opened, as indicated by the arrow 38c.

It has further been found that immediately following withdrawal of the blowpin 36 and for the next two to three minutes or so, the plastic of the neck finish 20 remains sufficiently pliable and of a sufficiently large, pre-shrinkage dimension, to permit the placement or insertion of the rim or edge of a circular or annular item into the undercut channel 46. This placement or insertion may be easily and expediently achieved soon after the mold 38 opens due to the pliability of the plastic material and the small amount of the total shrinkage which occurs by that time. Thereafter, the majority of the shrinkage of the dimensions of the bottle 22 and of the neck finish 20, including the undercut channel 46 formed in the interior thereof, proceeds, until within about one hour there will have occurred 90% of the total of such shrinkage that can occur. Accordingly, an item previously inserted into and located in the channel 46 will be firmly gripped in the now diametrically shrunk channel 46 and will be positively retained therein by the action of the undercut channel 46. It should be noted that the undercut of the channel 46 and the shrinkage render unimportant holding to close tolerances the degree of the undercut or the precise diameters (initial or final) of the channel 46.

In preferred embodiments of this invention the item placed in the channel 46 while the bottle and its neck finish 20 are hot and substantially unshrunk is a surface feature 50 such as a rim, lip or bead 51 formed peripherally about a portion of the spout 48 (FIGS. 6–12) for the bottle 22.

Figure 10:
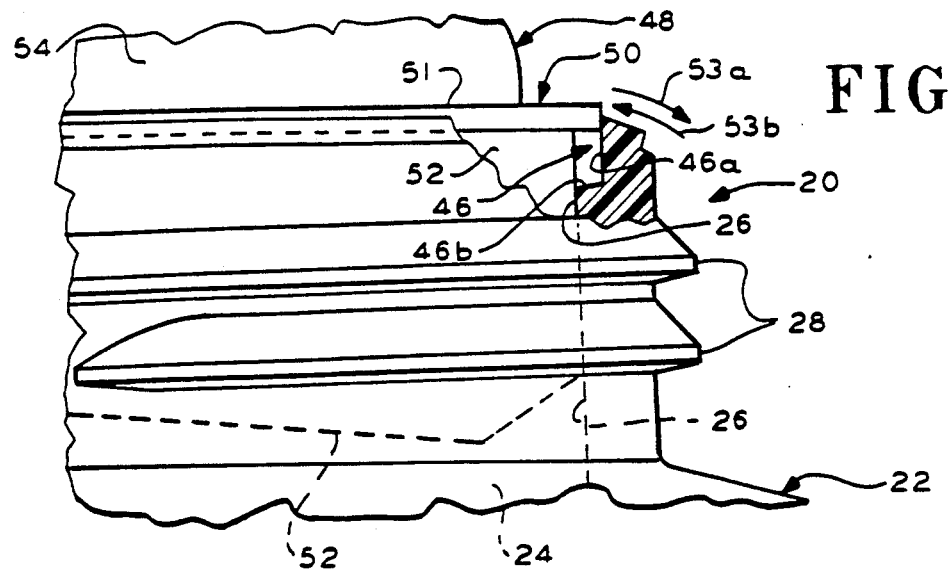
FIG. 10 is a partial view of the bottle of FIGS. 1 and 2 and the spout of FIGS. 6-9 illustrating the procedure for attaching the spout to the bottle.
Figure 11:
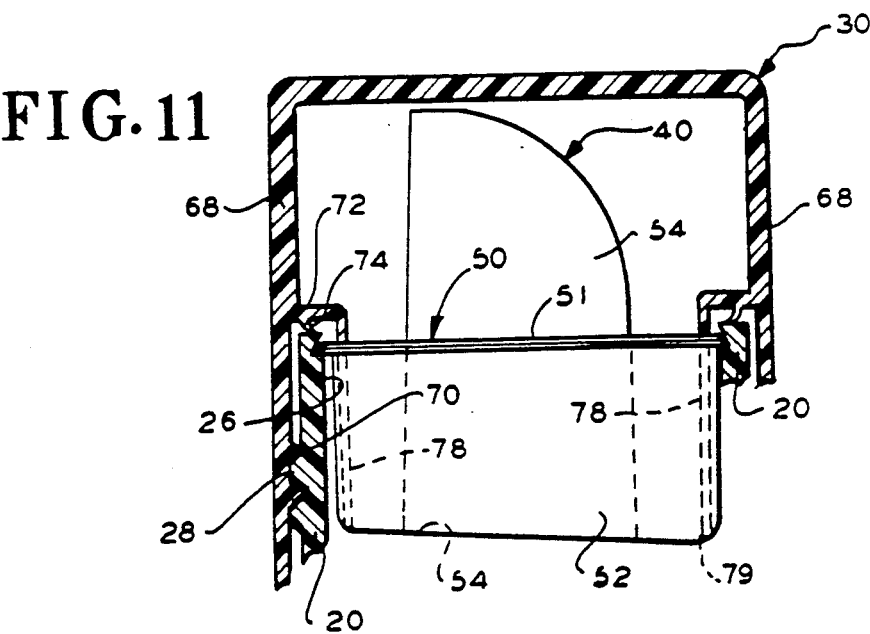
FIG. 11 is a partially sectioned, side elevation of a bottle (as in FIGS. 1 and 2) having attached thereto a spout (as in FIGS. 6-9) and having mounted thereon a novel closure according to the present invention.
Figure 12:
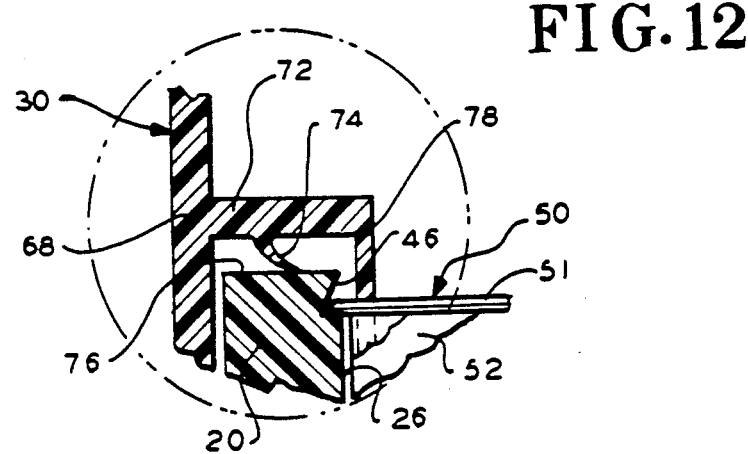
FIG. 12 is an enlarged view of an encircled portion of FIG. 11.

The spout 48 may be molded from HDPE or other suitable material and, as shown in the Figures, is preferably a pour-back spout, although other spout configurations are suitable. The pour-back spout 48 of the preferred embodiments includes a cylindrical base 52, around an upper edge of which the bead generally is formed. Along the lines of the foregoing, discussion the OD of the bead 51 is such that, as long as the material thereof is still hot and substantially unshrunk, the bead 51 can be pushed or snapped into the undercut channel 46 on the interior of the neck finish 20 while inserting the base 52 into the opening 26. As seen in FIG. 10, such insertion of the base 52 causes the wall 46a of the undercut channel 46 to momentarily deflect outwardly, as indicated by the arrow 53a, as it is bypassed by the bead 51, which has a diameter substantially to that of the wall 46b. Subsequently, the developing plastic memory of the neck finish 20 causes the wall 46a to reassume is sloped configuration as the bead 51 bottoms on the wall 46b, as indicated by the arrow 53b and as seen in FIGS. 11 and 12. The OD of the bead 51 is such that after the neck finish 20 shrinks, the bead 51 and its base 52 will be firmly and positively held in the undercut channel 46 of the neck finish 20. Leakage of the contained substance past the bead/channel 51/46 interface will rarely, if ever, occur.

The spout 48 also includes a pouring nozzle or funnel portion 54, which is generally cylindrical. The major axes of the funnel 54 and the base 52 are generally parallel, with the base 52 surrounding the lower portion of the funnel 54, the upper portion of which protrudes above the bead 51 on the base 52. The lower edges of the funnel 54 and the base 52 are joined by an annular, integral floor or web 56.

Figure 7:
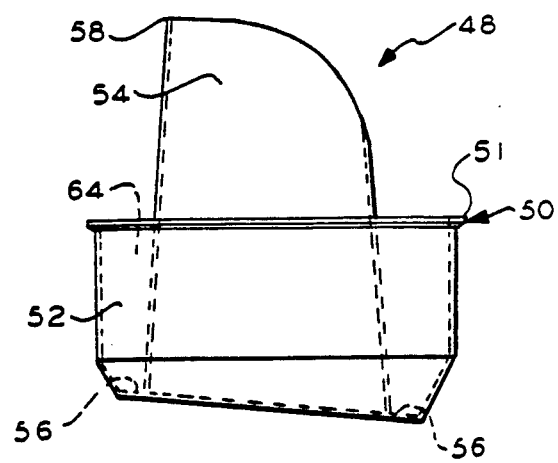
Figure 8:
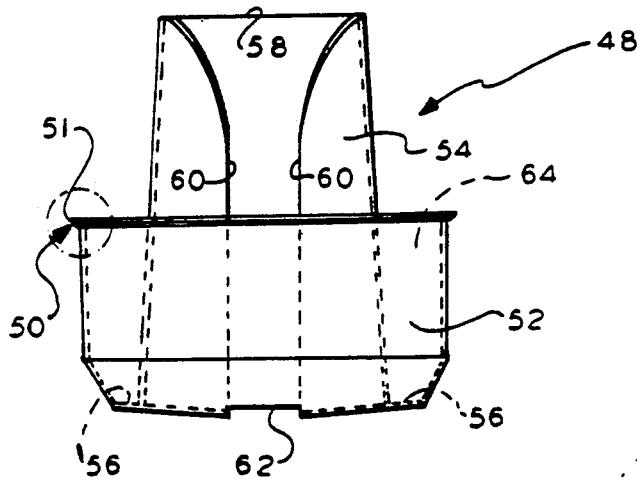
Figure 9:
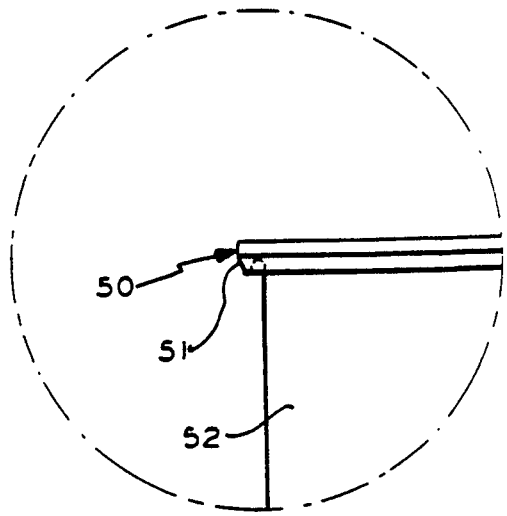
FIG. 9 is an enlarged view of an encircled portion of the spout of FIG. 8.

The upper portion of the funnel 54 defines or is formed into a pouring lip 58. Running from a region of the upper portion of the funnel 54 diametrically opposite the pouring lip 58 is a slot 60, which preferably extends along and down the funnel 54 to and past the point where the funnel 54 and the web 56 meet. The slot 60 may thus be extended into the web 56 to form a drain hole 62, or, if the slot 60 stops short of the funnel/web 54/56 juncture, a separate drain hole 62 may be formed in that approximate location. As best seen in FIG. 7, the web 54 preferably slopes downwardly from a point directly beneath the pouring lip 58 along the web 54 on either side of the funnel 54 to the drain hole 62. The foregoing structure directs to the drain hole 62 any material poured from the lip 58 which happens to run down the funnel 54. Since the spout 48 is held in the neck finish 20 of the bottle 22, liquid running through the drain hole 62 reenters the bottle 22. A trough 64 defined between the funnel 54 and the base 52 and by the web 56 prevents material which runs down the spout 48 from reaching the exterior of the bottle 22. This type of pour-back or drain-back spout 48 therefore decreases the messiness which might otherwise accompany the pouring of contained material.

Spouts having specific configurations different from that described above may be used if desired as long as they posses the bead 51 or other surface feature 50 thereon to hold them in the neck finish 20. As best shown in FIGS. 11 and 12, the OD of the base 52 below the bead 51 is substantially equal to the ID of the opening 26 in the neck finish 20, though, in view of the coaction of the bead 51 and the undercut channel 46, a tight fit between the base 52 and the opening 26 need not be relied on to positively attach the spout 48 to the neck finish 20.

As seen in FIGS. 11 and 12, the closure 30 is preferably a generally cylindrical member 68 which may be molded from a suitable material such as polypropylene. A lower interior portion of the member 68 may include a thread 70 which mates with the thread 28 molded into the exterior of the neck finish 20 to removably affix the closure 30 to the neck finish 20. When the closure 30 is so affixed, it surrounds the spout 48 and prevents material within the bottle 22 from being inadvertently spilled or poured. To aid in this sealing function, an interior surface of the member 68 may include an annular ledge 72 from which there depends an annular, flexible or deformable seal 74. The seal 74 is molded as part of the ledge 72 so as to be slightly inwardly directed. The inward direction of the seal 74, coupled with its deformability, leads to its first abutting and then flexing and sealing against a top surface 76 of the neck finish 20 above the undercut channel 46, as shown in FIGS. 11 and 12. The seal 74 may also seal against the upper rim of the channel 46 or may enter the channel 46.

The ledge 72 may also include an integral depending cylinder 78 within the closure 30. This cylinder 78 may be dimensioned so that its lower edge 79 is proximate to or abuts some or all of the web 56 of the spout 48 when the closure 30 is firmly affixed to the bottle 22 via the interfitting of the threads 70 and 28 on the closure 30 and the neck finish 20. This proximity or abutment limits or prevents the spout 48 from coming out of the neck finish 20, notwithstanding jarring which may occur during shipping or stocking of the bottle 22 and its contents.

The foregoing represents certain preferred embodiments of the present invention. Those skilled in the art will appreciate that numerous changes and modifications of the foregoing are possible without departing form the spirit and scope hereof. These and various other equivalent elements are intended to be covered by the claims which follow hereafter.

What is claimed is:

1. A process for making a dispensing package, the package including a bottle having an integral neck finish which includes an uppermost cylindrical collar and a pouring spout having an annular surface feature for mounting the spout, said process comprising;

forming the bottle by blow-molding from a polymer;

simultaneously with said blow-molding forming the polymer about a member to produce an annular, undercut channel in the interior surface of the collar;

removing the member before the collar cools significantly, said cooling causing shrinkage of the collar, the removal of the member momentarily expanding the channel, the plastic memory of the collar thereafter returning the channel to substantially its as-formed dimension; and inserting the surface feature into the channel before the collar cools significantly and before the majority of cooling-caused shrinkage of the collar occurs.

* * * * *